(12) United States Patent
Labbe et al.

(10) Patent No.: US 8,190,207 B2
(45) Date of Patent: May 29, 2012

(54) COMMUNICATION SYSTEM AND METHOD OF OPERATION THEREFOR

(75) Inventors: Patrick Labbe, Antony (FR); Mohamed Kamoun, Palaiseau (FR); Laurent S. Mazet, Paris (FR)

(73) Assignee: Motorola Mobility, Inc., Libertyville, IL (US)

(*) Notice: Subject to any disclaimer, the term of this patent is extended or adjusted under 35 U.S.C. 154(b) by 906 days.

(21) Appl. No.: 12/107,353

(22) Filed: Apr. 22, 2008

(65) Prior Publication Data

US 2009/0262676 A1 Oct. 22, 2009

(51) Int. Cl.
*H04M 1/00* (2006.01)

(52) U.S. Cl. .............. 455/561; 455/422.1; 455/550.1; 455/562.1

(58) Field of Classification Search .......... 455/561, 455/562, 422.1, 550.1, 562.1
See application file for complete search history.

(56) References Cited

U.S. PATENT DOCUMENTS

| | | | |
|---|---|---|---|
| 7,062,295 B2 * | 6/2006 | Yoshii et al. | 455/562.1 |
| 7,184,743 B2 | 2/2007 | Walton et al. | |
| 7,406,337 B2 | 7/2008 | Kim et al. | |
| 7,813,262 B1 * | 10/2010 | Rao | 370/208 |
| 7,953,176 B2 | 5/2011 | Roh | |
| 2003/0086479 A1 | 5/2003 | Naguib | |
| 2005/0185730 A1 | 8/2005 | Hansen et al. | |
| 2005/0265470 A1 | 12/2005 | Kishigami et al. | |
| 2007/0155336 A1 | 7/2007 | Nam et al. | |
| 2008/0081565 A1 * | 4/2008 | Kim | 455/63.1 |
| 2008/0159425 A1 | 7/2008 | Khojastepour et al. | |
| 2008/0165875 A1 | 7/2008 | Mundarath et al. | |
| 2009/0316802 A1 | 12/2009 | Tong et al. | |

OTHER PUBLICATIONS

Gozali, Ran et al.: The Impact of Multiuser Diversity on Space-Time Block Coding, IEEE Communications Letters, vol. 7, No. 5, May 2003, pp. 213-215.
Larsson, Erik G.: On the Combination of Spatial Diversity and Multiuser Diversity, IEEE Communications Letters, vol. 8, No. 8, Aug. 2004, pp. 517-519.
Sun, Chen et al.: Combining Beamforming with Alamouti Scheme for Multiuser MIMO Communications, In Proceedings of the IEEE Vehicular Technology Conference, Fall, vol. 2, Los Angeles, USA, Sep. 2004, pp. 1415-1419.
Vicario, Jose Lopez et al.: Joint exploitation of spatial and multi-user diversity via space-time block-coding and antenna selection,In Proc. IEEE International Conference on Communications, 2005, vol. 5, 0-7803-8938-7/05, pp. 2911-2915.
Beheshti M. et al.: "Minimum Variance Linear Receivers for Multiaccess MIMO Wireless Systems with Space-Time Block Coding", IEEE Transactions on Signal Processing, IEEE Service Center, New York, NY, US vol. 52, No. 12, Dec. 1, 2004, pp. 3306-3313.

(Continued)

*Primary Examiner* — Nghi Ly (57) ABSTRACT

A communication system comprises a set of user equipments which are arranged to simultaneously transmit a signal over an air interface to a base station. Each of the transmitted signals comprises a data stream encoded by a space time block code and transmitted on multiple antennas. Specifically, an Alamouti code may be used. The base station generates a received data stream for each of the set of user equipments by joint space time block code decoding of the signals from the set of user equipments. The invention may provide improved performance and increased capacity and may in particular provide efficient multi user operation for a system using space time block codes. The user equipments may be scheduled in response to cross interference metrics reflecting a cross interference between simultaneously transmitting user equipments.

8 Claims, 3 Drawing Sheets

OTHER PUBLICATIONS

Al-Dhahir N et al.: "Algebraic properties of space-time block codes in intersymbol interference multiple-access channels", IEEE Transactions on Information Theory, IEEE, US vol. 49, No. 10, Oct. 1, 2003, pp. 2403-2414.

Jeong J H et al.: "An iterative receiver for layered space-time MIMO DS-CDMA uplink using turbo trellis-coded modulation", Wireless Communications and Networking Conference, 2005 1III New Orleans, LA, USA Mar. 13-17, 2005, Piscataway, NJ, USA, IEEE, vol. 1, Mar. 13, 2005, pp. 320-325.

Jane W Huang et al: "Precoding of Space-Time Block Codes in Multiuser MIMO Channels with Outdated Channel State Information", Information Theory, 2007, ISIT 2007, IEEE International Symposium on, IEEE, Piscataway, NJ, USA, Jun. 24, 2007, pp. 2031-2035.

Miclea, Sorin, "The International Search Report and the Written Opinion of the International Searching Authority or the Declaration", European Patent Office, Rijswijk, date of completion: Aug. 14, 2009, date o mailing : Aug. 24, 2009.

Yoshitaka Hara, et al., "Uplink Spatial Scheduling With Adaptive Transmit Beamforming in Multiuser MIMO Systems," Proceedings of the 17th Annual IEEE International Symposium on Personal, Indoor and Mobile Radio Communications (PIMRC'06), Sep. 2006, pp. 1-5.

Xi and Zoltowski, "Uplink Multiuser MIMO Transceiver Design With Transmitting Beamforming Under Power Constraints," IEEE Military communications Conference, 2006 (MILCOM 2006) Oct. 23-25, 2006, pp. 1-7.

\* cited by examiner

COMMUNICATION SYSTEM AND METHOD OF OPERATION THEREFOR

FIELD OF THE INVENTION

The invention relates to a communication system and method of operation therefor and in particular, but not exclusively, to a Wireless Local Area Networks (WLAN).

BACKGROUND OF THE INVENTION

In recent years, the popularity of systems using wireless radio communication has increased substantially. For example, cellular communication systems and wireless networks have now become commonplace. The increased requirement for frequency spectrum resource has led to an increased desire for efficient communication and especially at higher frequencies and for higher data rates.

For example, Wireless Local Area Networks WLANs are becoming common not only in business environments but also in domestic environments. In order to increase the capacity of such WLANs, it is desirable to increase the data rate of the wireless communication. As a specific example, the Institute of Electrical and Electronic Engineers (IEEE) have formed a committee for standardising a high-speed WLAN standard known as IEEE 802.11n™. The 802.11n™ standard comprises Wireless LAN Medium Access Control (MAC) and Physical Layer (PHY) Specifications aimed at enhancing WLANs to provide higher effective data throughputs. It is intended that the 802.11n™ standard will help WLANs meet the expanding bandwidth needs of enterprise and home networks, as well as those of WLAN hot spots.

In order to achieve high data rates over the air interface, a number of advanced radio techniques are employed. It has been found that in systems using open-loop approaches (i.e. without the transmitter using knowledge of the transmit channel or the signal received at the receiver) significant improvement can be achieved by using multiple antennas at the transmitter and the receiver. In particular, many radio communication systems, such as WLANs, provide for a plurality of transmit and receive antennas to be used. Specifically, some transmission techniques involve transmitting a data stream by simultaneously transmitting different signals derived from the data stream from different antennas over the same communication channel. The receiver(s) of these techniques typically also comprise a plurality of antennas each of which receive a combined signal corresponding to the transmitted signals modified by the individual propagation characteristics of the radio link between the individual antennas. The receiver may then retrieve the transmitted data stream by evaluating the received combined signal.

Such techniques are known as Multiple Transmit Multiple Receive (MTMR) or Multiple Input Multiple Output (MIMO) schemes and can be designed to derive benefit from spatial diversity between the antennas in order to improve detection. Indeed, the equivalent Signal to Noise Ratio (SNR) of the combined signal is typically increased compared to the single antenna case thereby allowing higher channel symbol rates or higher order constellations. This may increase the data rate for the communication link and thus the capacity of the communication system.

For the situation where two transmit antennas are used, an efficient transmit case has been proposed in "A simple transmit diversity technique for wireless communications," by S. M. Alamouti IEEE Journal on Selected Areas in Comm., pp. 1451-1458, October 1998. The proposed technique is known as Alamouti coding and comprises transmitting two symbols from two antennas during two symbol times such that the original symbols may easily be derived by a receiver. The proposed technique is a specific case of Space-Time Block Coding (STBC) and results in high performance for two transmit antennas by providing for orthogonal transmission of the two symbols while fully exploiting the spatial diversity of the two antennas.

In order to increase the spectral efficiency of the system it has been proposed to extend the Alamouti coding technique to more than two transmit antennas by simultaneously transmitting different data streams from different antenna pairs. For example, a single data stream may be split into two sub-data streams which are then individually Alamouti coded and simultaneously transmitted over the same communication channel from different antenna pairs. Thus, in this technique, data is transmitted over four transmit antennas by individually Alamouti coding two data streams and simultaneously transmitting each of the resulting data streams over two of the four antennas. Hence, two data streams are transmitted simultaneously from four antennas, each stream being encoded using the Alamouti code. However, although improved performance may be achieved over a classical four antenna space division multiplexing scheme, the resulting data rate is significantly reduced due to the symbol doubling associated with the Alamouti code.

The increased spectral efficiency of STBC is due to the exploitation of spatial diversity and specifically is due to the system reducing the probability of deep fades by averaging over different transmit branches. However, as a result, the combination of STBC with other techniques that tend to exploit variations in the experienced communication channel tend not to provide the expected performance benefit. For example, in the article "The impact of multiuser diversity on space-time block coding", Ran Gozali, R. Michael Buehrer, and Brian D. Woerner, IEEE Communication Letters, 7(5): 213-215, May 2003, it is demonstrated that the performance gain of using STBC in a multi-user context is relatively limited. Indeed the application of STBC results in a suppression of deep fades but also results in peaks being suppressed resulting in an averaging of the experienced SNR. As a consequence, scheduling systems that are aimed at scheduling users when they experience advantageous propagation conditions will tend to be less efficient as the peak conditions during which users are typically scheduled are reduced by the STBC technique.

Furthermore, the resource and computational requirements associated with STBC communication and scheduling tends to be substantial resulting in increased cost, resource usage and complexity.

Hence, an improved communication system would be advantageous and in particular a system allowing increased flexibility, facilitated implementation, reduced complexity, reduced resource usage, increased spectral efficiency, improved and/or facilitated multi-user operation and/or improved performance would be advantageous.

SUMMARY OF THE INVENTION

Accordingly, various embodiments of the invention seek to preferably mitigate, alleviate or eliminate one or more of the above mentioned disadvantages singly or in any combination.

According to an aspect of the invention there is provided a communication system comprising: a set of user equipments each being arranged to simultaneously transmit a signal over an air interface to a base station, each signal comprising a data stream encoded by a space time block code and transmitted on multiple antennas; the base station comprising a receiver for generating a received data stream for each of the set of user equipments by joint space time block code decoding of the signals from the set of user equipments.

The invention may allow improved performance in a communication system. In particular, space time block code and multi-user operation may be effectively combined. The communication system may have improved spectral efficiency and/or increased capacity in comparison to many communication systems. In particular, an improved exploitation of spatial diversity and separation may be achieved. Furthermore, the invention may allow reduced complexity and/or a facilitated operation and/or implementation in comparison to many systems.

The base station may specifically comprise a space time block code receiver arranged to jointly receive and decode signals from the multiple antennas of all user equipments simultaneously transmitting to the base station using the same resource block (e.g. using the same time and frequency block). The space time block code receiver may for example be a Zero Forcing (ZF) receiver or a Minimum Mean Square Error (MMSE) receiver.

The communication system may specifically comprise: a first user equipment arranged to transmit a first signal over an air interface to a base station, the first signal comprising a first data stream encoded by a first space time block code and being transmitted on first multiple antennas; a second user equipment arranged to transmit a second signal over the air interface to the base station, the second signal comprising a second data stream encoded by a second space time block code and being transmitted on second multiple antennas and simultaneously with the first signal; and the base station comprising means for generating a received first data stream corresponding to the first data stream and a received second data stream corresponding to the second data stream by joint space time block code decoding of the first signal and the second signal.

The described approach may for example be particularly advantageous for an IEEE 802.11n™ Wireless Local Area Network (WLAN) or an IEEE 802.16m™ Wireless Metropolitan Area Network (WMAN).

According to an optional feature of the invention, the communication system further comprises an air interface scheduler for selecting user equipments for the first set of user equipments from a second set of user equipments in response to cross interference metrics for subsets of user equipments from the second set of user equipments, the cross interference metric for a subset being indicative of cross interference between at least some user equipments of the subset.

The feature may allow improved performance and may in particular in many embodiments and scenarios result in improved spectral efficiency and/or capacity. An improved multi-user operation of a communication system can be achieved and in particular user equipments particularly suitable for joint STBC operation can be selected. For example, the cross interference metric may be indicative of a degree of orthogonality between propagation channels for the user equipments in the subset.

Each of the subsets may correspond to a potential selection of user equipments for the first set. Specifically, the number of user equipments in each subset may be identical to the number of users in the first set. The air interface scheduler may sequentially select user equipments for the first set for individual scheduling intervals, such as air interface time slots. The subsets may be possible first sets that can be selected between by the air interface scheduler for a given scheduling interval. The cross interference metric may be indicative of an impact of cross interference on the received data streams when received by the joint STBC decoding of data streams from user equipments in the subset.

According to another aspect of the invention there is provided a base station for a communication system including a set of user equipments each being arranged to simultaneously transmit a signal over an air interface to the base station, each signal comprising a data stream encoded by a space time block code and transmitted on multiple antennas; the base station comprising: a receiver for generating a received data stream for each of the set of user equipments by joint space time block code decoding of the signals from the set of user equipments.

According to another aspect of the invention there is provided a method of operation for a communication system, the method comprising: a set of user equipments simultaneously transmitting a signal over an air interface to a base station, each signal comprising a data stream encoded by a space time block code and transmitted on multiple antennas; and the base station generating a received data stream for each of the set of user equipments by joint space time block code decoding of the signals from the set of user equipments.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a WLAN communication system and in particular to an IEEE 802.11n™ WLAN but also applicable to a WMAN communication system and in particular to an IEEE 802.16m™ communication system. However, it will be appreciated that the invention is not limited to this application but may be applied to many other communication systems including for example cellular communication systems.

Figure 1:
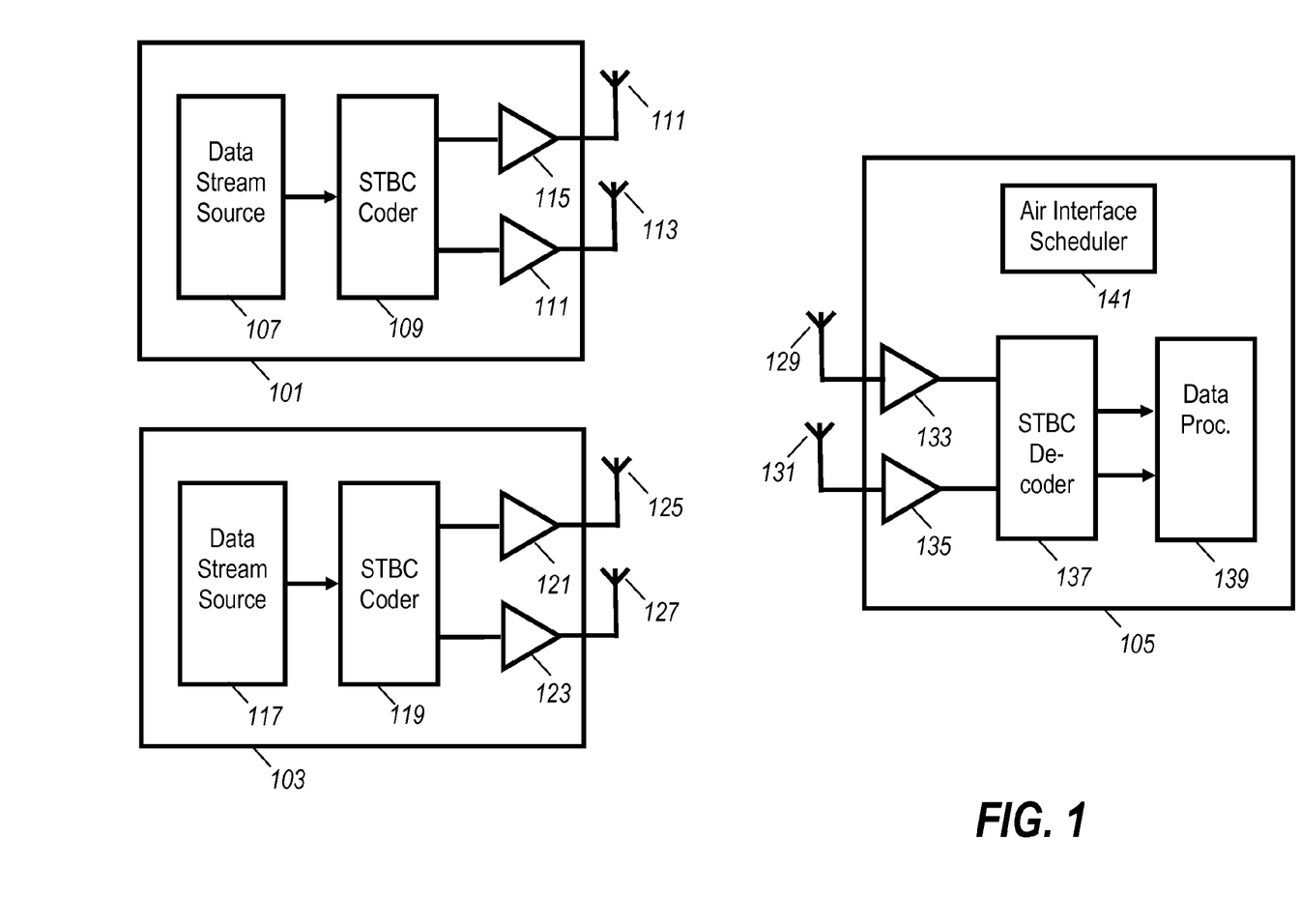
FIG. 1 is an illustration of elements of a radio communication system in accordance with some embodiments of the invention.

FIG. 1 illustrates examples of elements of a radio communication system in accordance with some embodiments of the invention. In the system, the air interface resource of the base stations are divided into time slots and within each time slot two user equipments are allocated to simultaneously transmit to the base station.

Furthermore, both user equipments allocated in a time slot transmit using an STBC code and the received signals are jointly decoded to generate the individual data streams from the two simultaneously scheduled user equipments.

FIG. 1 illustrates an example of the operation of the radio communication system during a specific time slot. In the example, a first and second user equipment 101, 103 are simultaneously transmitting signals to a base station 105.

In the example, the user equipments 101, 103 are WLAN devices operating in accordance with the 802.11n™ or 802.16m™ communication standards but it will be appreciated that in other embodiments the user equipments may be e.g. a mobile phone, a remote station, a 3G User Equipment or indeed any entity capable of communicating over an air interface of a communication system. In the example, the base station is a WLAN access point communicating in accordance with the 802.11n™ or 802.16m™ communication standards but it will be appreciated that in other embodiments the base station may be e.g. a cellular base station or any entity capable of supporting a plurality of user equipments over the air interface of a communication system.

The first user equipment 101 comprises a data stream source 107 which generates a data stream comprising data symbols to be transmitted to the base station 105 over the air interface. The data stream is fed to an STBC coder 109 which encodes the data stream using a space time block code. In the specific example, the first user equipment 101 uses two transmit antennas 111, 113 which are coupled to the STBC coder 109 via separate transceivers 115, 117 comprising up-converters, amplifiers etc as will be known to the person skilled in the art.

The second user equipment 103 is in the specific example identical to the first user equipment 101 and accordingly also comprises a data stream source 117, an STBC coder 119, two amplifiers 121, 123 and two transmit antennas 125, 127.

In the system of FIG. 1, the two user equipments 101, 103 apply the same STBC code but it will appreciated that in other embodiments different STBC codes may be applied. Also, it will be appreciated that parallel data streams and more than two antennas may be used by each user equipment and indeed that the number of parallel data streams/antennas may in some embodiments be different for different user equipments.

In the example of FIG. 1 each user equipment 101, 103 accordingly generates two parallel STBC coded data streams which are transmitted to the base station over the air interface. The parallel transmissions from the multiple antennas of each user equipment 101, 103 are jointly decoded by exploiting the knowledge imposed by the STBC code. Furthermore, the signals from both simultaneously transmitting user equipments 101, 103 are jointly decoded.

In the specific example, the STBC used by both user equipments 101, 103 is an Alamouti code. Accordingly, the data stream from the data stream source 107 is divided into pairs of symbols (s1, s2) which are transmitted by the two antennas 111, 113, in two symbol transmission time periods according to the Alamouti coding:

$$\begin{pmatrix} s_1 & s_2 \\ -s_2^* & s_1^* \end{pmatrix}$$

where $s_1$, $s_2$ are the two data symbols being transmitted, each row corresponds to a data symbol time interval and each column corresponds to a transmit antenna.

In the example, where both the first and second user equipments 101, 103 are transmitting two data symbols in each data symbol time interval, a total of four complex symbols are transmitted in a data symbol time interval with the Alamouti code generating symbols for the following data symbol time interval. Thus, denoting the data symbols transmitted by the first user equipment 101 by $s_1$, $s_2$ and the data symbols transmitted by the second user equipment 103 by $s_3$, $s_4$ the following STBC code matrix is obtained:

$$C = \begin{pmatrix} s_1 & s_2 & s_3 & s_4 \\ -s_2^* & s_1^* & -s_4^* & s_3^* \end{pmatrix}$$

where the symbols of the $n^{th}$ column of C are sent from the $n^{th}$ antenna and each row corresponds to a data symbol time interval.

For the following analysis, it is assumed that the system operates in a quasi-static flat fading environment, and we denote by $h_n$ the M×1 vector representing the channel coefficients of the propagation channel between transmit antenna n and the m receive antennas.

Also $y_1$ and $y_2$ denote the M×1 signals received in the $1^{st}$ and $2^{nd}$ data symbol time interval over which the Alomouti code is transmitted, and $n_1$ and $n_2$ denote the corresponding additive noise components.

The signal received by the base station 105 can accordingly be represented by:

$$\begin{pmatrix} y_1 \\ \underbrace{y_2^*}_{y} \end{pmatrix} = \Big( \underbrace{\begin{matrix} h_1 & h_2 \\ h_2^* & -h_1^* \end{matrix}}_{H_1} \Big| \underbrace{\begin{matrix} h_3 & h_4 \\ h_4^* & -h_3^* \end{matrix}}_{H_2} \Big) \times \underbrace{\begin{pmatrix} s_1 \\ s_2 \\ s_3 \\ s_4 \end{pmatrix}}_{s} + \begin{pmatrix} n_1 \\ n_2^* \\ n \end{pmatrix}$$

The channel matrix $H = H_1 | H_2$ is formed by two orthogonal sub-matrices $H_1$ and $H_2$ for which it can be shown that:

$$H_1^H H_1 = (\|h_1\|^2 + \|h_2\|^2) \cdot I_2 = c_1 I_2$$

and $$H_2^H H_2 = (\|h_3\|^2 + \|h_4\|^2) \cdot I_2 = c_2 I_2$$

Thus, the values $c_1$ and $c_2$ represent the gain of the propagation channels from each of the user equipments 101, 103 to the base stations and may accordingly be directly proportional to the signal to noise ratio that would be experienced by each user equipment if the other user equipment did not transmit simultaneously.

In the example, the base station 105 includes two antennas 129, 131 which are individually filtered, amplified, downconverted etc by two receive front ends 133, 135 as will be known to the person skilled in the art. The resulting two received signals (each represented by a single complex sample value for each data symbol time interval) are fed to an STBC decoder 137 which generates received copies (estimates) of the data symbols ($s_1$, $s_2$, $s_3$, $s_4$) transmitted from the two user equipments. Thus, the STBC decoder 137 generates a received copy of the data streams from the data stream sources 107, 117. The STBC decoder 137 is coupled to a data processor 139 which is operable to further process the data. For example, the data processor 139 may comprise functionality for implementing higher layers of the protocol stack, for interfacing to a centralised network etc.

The STBC decoder 137 specifically generates the received data stream for the two user equipments by joint space time block code decoding of the signals from the set of user equipments.

Thus, the data for the data stream from one user equipment 101 is not determined independently of the data for the data stream of the other user equipment 103. Rather, the contribution of the data from both user equipments 101, 103 to the received antenna signals are jointly considered so that the symbol decisions for one user equipment are dependent on the symbol decisions for the other user equipment. Specifically, the received data symbols may be selected as the four symbols which for the given STBC coding are most likely to result in the received signal being identical to the actual received signals.

Specifically, in the system both streams of data emitted by separate users are synchronized on the basis of pilots position so that the data from each user can be considered to have the same place in the frame.

It will be appreciated that the base station 105 may in different embodiments use different approaches for generating the received data streams.

In particular, the base station determines a propagation channel matrix representing the channel conditions from each antenna 111, 113, 125, 127 of each of the user equipments 101, 103 to each of a plurality of antennas 129, 131 of the base station 105. It may then apply a channel equalizer to the received signal to compensate for the effect of this propagation channel matrix.

For example, the base station may apply a Zero Forcing (ZF) receiver algorithm wherein (theoretically) the inverse propagation channel matrix is applied as a channel equalizer to the received signal.

Specifically, from the previous equation for the received signals (and ignoring the noise term), we find $$\begin{pmatrix} s_1 \\ s_2 \\ s_3 \\ \underline{s_4} \\ s \end{pmatrix} = \underbrace{\begin{pmatrix} h_1 & h_2 & h_3 & h_4 \\ h_2^* & -h_1^* & h_4^* & -h_3^* \end{pmatrix}}_{H_1 | H_2}^{-1} \times \begin{pmatrix} y_1 \\ \underline{y_2^*} \\ y \end{pmatrix} = H^{-1} \times \begin{pmatrix} y_1 \\ \underline{y_2^*} \\ y \end{pmatrix}$$

However, as the inverse propagation channel matrix $H^{-1}$ is not easily derivable or does not exist, an estimated inverse matrix can be used. Thus, an estimated inverse matrix for a propagation channel matrix representing channel conditions from each antenna of the multiple antennas of each of the set of user equipments to each of a plurality of antennas of the base station can be determined. This inverse matrix is then applied to the received signals to generate the symbol estimates for the transmitted data symbols.

Specifically, instead of the inverse propagation channel matrix $H^{-1}$, the pseudo-inverse matrix $H^{\#}$ can be used. The pseudo-inverse matrix $H^{\#}$ of the channel matrix may be defined as follows:

$$H^{\#} = (H^H H)^{-1} H^H$$

which can be rewritten as a function of the sub-matrices $H_1$ and $H_2$:

$$H^{\#} = \begin{bmatrix} H_1^H H_1 & H_1^H H_2 \\ H_2^H H_1 & H_2^H H_2 \end{bmatrix}^{-1} \begin{bmatrix} H_1^H \\ H_2^H \end{bmatrix}$$

Thus, the pseudo inverse matrix can be determined by combining a plurality of single user equipment propagation channel matrices ($H_1$ and $H_2$) where each single user equipment propagation channel matrix represents channel conditions from each antenna of a single user equipment to the antennas of the base station.

An orthogonal matrix P can be defined as:

$$P = H_1^H H_2$$

Due to the orthogonality of this matrix, P fulfills the relation $$PP^H = P^H P = c_3 I_2$$

where $$c_3 = |h_1^H h_3 + h_2^T h^*_4|^2 + |h_1^H h_4 - h_2^T h^*_3|^2$$

An analytic form of the pseudo-inverse of the channel matrix can accordingly be derived as:

$$H^{\#} = \frac{1}{c_1 c_2 - c_3} \underbrace{\begin{bmatrix} c_2 I_2 & -P \\ -P^H & c_1 I_2 \end{bmatrix}}_{W_2^{ZF}} \begin{bmatrix} H_1^H \\ H_2^H \\ \overline{W_1^{ZF}} \end{bmatrix}$$

Thus, the pseudo-inverse propagation channel matrix $H^{\#}$ can be determined directly from the single user equipment propagation channel matrices ($H_1$ and $H_2$) without requiring any matrix inversions.

Thus, the STBC decoder 137 may generate the received symbols by performing the operation given by:

$$\begin{pmatrix} s_1 \\ s_2 \\ s_3 \\ \underline{s_4} \\ s \end{pmatrix} = H^{\#} \times \begin{pmatrix} y_1 \\ \underline{y_2^*} \\ y \end{pmatrix}$$

From the equation for the pseudo-inverse propagation channel matrix $H^{\#}$ it can furthermore be seen that the ZF receiver can be decomposed into two stages with an initial filtering of the received signal y by $W_1^{ZF}$ thereby removing the contribution from the other signal within each Alamouti code. Secondly, the filter $W_2^{ZF}$ is applied to the resulting signal in order to recover the two transmitted streams.

Based on these considerations, a signal to noise ratio for the first user equipment can furthermore be found as:

$$SNR_1 = c_1 - c_3/c_2$$

and for the second user equipment as:

$$SNR_2 = c_2 - c_3/c_1$$

The first term of these expressions correspond to the signal to noise ratio that would be experienced if no other user equipment was allocated for simultaneous transmission. The second term represents a degradation resulting from the spatial multiplexing compared to the SNR achieved by the classical Alamouti scheme.

It will be appreciated that other receiver structures can be used. For example, the STBC decoder 137 may implement a Minimum Mean Square Error (MMSE) Receiver algorithm.

For the MMSE receiver, the filter W is defined as:

$$W = (H^H H + \sigma_n^2 I_4)^{-1} H^H$$

where $\sigma_n^2$ denotes the variance of the additive white gaussian noise and the symbols are assumed to be adequately normalized.

W is applied to the received signal y to generate the received symbols:

$$\begin{pmatrix} s_1 \\ s_2 \\ s_3 \\ \underline{s_4} \\ s \end{pmatrix} = W \times \begin{pmatrix} y_1 \\ \underline{y_2^*} \\ y \end{pmatrix}$$

It can be shown that W can be expressed without matrix inversion as $$W = \frac{1}{d_1 d_2 - c_3} \underbrace{\begin{bmatrix} d_2 I_2 & -P \\ -P^H & d_1 I_2 \end{bmatrix}}_{W_2^{MMSE}} \underbrace{\begin{bmatrix} H_1^H \\ H_2^H \end{bmatrix}}_{W_1^{MMSE}}$$

where $d_1 = \|h_1\|^2 + \|h_2\|^2 + \sigma_n^2 = c_1 + \sigma_n^2$ $d_2 = \|h_3\|^2 + \|h_4\|^2 + \sigma_n^2 = c_2 + \sigma_n^2$ Thus, a first stage filtering using $W_1^{MMSE}$ can be performed in the same way as for ZF detection to benefit from the orthogonality within each Alamouti code. A second stage based on the $W_2^{MMSE}$ filter then takes into account the variance of the additive noise to better detect the two transmitted streams and is specific to MMSE equalization.

In a typical communication system, a relatively large number of user equipments are supported by each base station. In the communication system of FIG. 1, the base station 105 supports a number N of user equipments by dividing an air interface communication channel (carrier) into a number of sequential scheduling time slots or intervals. Thus, the system uses time division multiplexing to accommodate the N users. However, in the system two user equipments are allocated for simultaneous transmission in each scheduling time slot with each user equipment using STBC coding as previously described.

The performance of the individual communications and the resulting capacity of the communication system as a whole are highly dependent on which user equipments are scheduled together in each scheduling interval. Specifically, as the two user equipments will introduce interference to each other, it is important to minimise this interference as much as possible. For example, if two user equipments are selected which have completely orthogonal channels, the cross interference can be completely resolved resulting in no degradation to the individual user equipment from the simultaneous transmission of the other user equipment.

In the system of FIG. 1 the base station 105 accordingly comprises an air interface scheduler 141 for selecting user equipments for each scheduling time slot from the N user equipments. It will be appreciated that although the following description focuses on an example wherein the scheduler 141 is located in the base station 105, it may in other embodiments be located elsewhere, such as in an interconnecting network, or may e.g. be distributed over a plurality of logical or physical locations and entities.

The scheduler 141 selects the user equipments for a given scheduling time slot in response to cross interference metrics for different subsets of user equipments from the second set of user equipments. The cross interference metric for a subset is indicative of cross interference between at least some user equipments of the subset. In the specific example, two user equipments are selected for each scheduling time slot and each subset is selected to comprise two user equipments. Furthermore, the cross interference metric is determined as a measure that indicates the expected cross interference between the two user equipments of the subset when simultaneously transmitting.

As an example, the air interface scheduler 141 may for the next scheduling time slot generate two user equipment subsets corresponding to all combinations of pairs of user equipments from the scheduling pool of N user equipments. For each subset, an interference metric is then determined that represents the degradation caused by two user equipments transmitting simultaneously. The air interface scheduler then evaluates the determined interference metrics and selects the subset having the lowest interference metric (where an increasing value of the interference metric is indicative of increasing degradation/interference). The two user equipments of the selected subset are then allocated to the scheduling time slot.

Thus, in the example each subset corresponds to a potential allocation of user equipments to a scheduling time slot and all subsets contains the number of user equipments that are simultaneously allocated in a scheduling time slot.

In the system, the STBC decoder 137 uses joint detection wherein the contribution of transmissions from both user equipments 101, 103 to the received signals are jointly considered. If the propagation channels are completely orthogonal, the individual contribution from each user equipment 101, 103 can be completely separated and the receiver may for each data stream provide the same performance as if only this user equipment was transmitting. However, as the orthogonality decreases it is not possible to completely separate the contributions and thus the interference between the two signals begin to introduce degradation to the received data streams. Accordingly, the interference metric is in the specific example determined to reflect the orthogonality between the propagation channels from the two user equipments 101, 103 to the base station 105.

The interference metric is calculated based on channel estimates for each of the propagation channels between each transmit antenna (of the user equipments) and each receive antenna (of the base station). The channel estimates may for example be determined based on the inclusion of known symbols in the transmissions etc as will be well known to the person skilled in the art. The propagation channels are assumed to be sufficiently static to allow the channel estimates from the previous transmission from a user equipment to be used to determine an interference metric. In most communication systems, the resulting scheduling impact will be negligible or at least acceptable.

Thus, the system generates the interference metric for a given subset as an orthogonality measure for the propagation channels of the user equipments of the subset. In order to provide comparable interference metrics, the orthogonality measure is normalised in response to the propagation channel gains between each user equipment of the subset and the base station.

The orthogonality measure is determined from the channel estimates for the propagation channels between each user equipment of the subset and the base station, and in the specific example the interference metric is determined as a function of only these channel estimates. Thus, the only dynamic data used to calculate the interference metric for a subset of user equipments is the channel estimates. This allows a low complexity calculation of interference metrics and reduces the requirement for data generation and gathering.

In the following a specific example of a cross-interference metric meeting all these requirements is derived based on the previously described description of the STBC transmission and reception process for the system of FIG. 1.

As previously described, the signal to noise ratios of the Alamouti transmissions from individual user equipments can be represented by:

$$SNR_1 = c_1 - c_3/c_2$$

$$SNR_2 = c_2 - c_3/c_1$$

Thus, the signal to noise ratio is given by a first term $c_1$ respectively $c_2$ which corresponds to the SNR that each user would experience if only that user is transmitting. The second term $c_3/c_2$ respectively $c_3/c_1$ corresponds to a cross-interference resulting from the other user equipments and is due to the channels not being orthogonal and that the individual contributions accordingly cannot be resolved.

In order to increase the average capacity of the system, it is advantageous to seek to maximise the signal to noise ratio for all user equipments. Accordingly, it is desirable to try to select simultaneously allocated user equipments such that the second terms $c_3/c_2$ and $c_3/c_1$ of the above equations are minimised.

A suitable metric may specifically be $c_3/(c_1 c_2)$. This metric has the advantage that it includes a normalisation of the interference metric and furthermore is a symmetric cross interference metric that has an equal weighting of all user equipments of the subset. Thus, the degradation to one user equipment caused by transmissions of the other user equipment is weighted equally as degradation to the other user equipment caused by transmissions of the first user equipment.

Defining $(h_{i1}, h_{i2})$ as the channel estimates for the propagation channels experienced by user i (replacing $h_1$ and $h_2$ in the previously described equations for $c_1$ and $c_3$) and $(h_{j1}, h_{j2})$ as the channel estimates for the propagation channels experienced by user j (replacing $h_3$ and $h_4$ in the previously described equations for $c_2$ and $c_3$), an interference metric $I_m(i,j)$ between users i and j is defined by:

$$I_m(i, j) = \frac{|h_{i1}^H h_{j1} + h_{i2}^T h_{j2}^*|^2 + |h_{i1}^H h_{j2} - h_{i2}^T h_{j1}^*|^2}{(\|h_{i1}\|^2 + \|h_{i2}\|^2)(\|h_{j1}\|^2 + \|h_{j2}\|^2)}$$

In the specific example where only two users are simultaneously allocated and thus each subset comprises only two user equipments, this interference metric may be used directly. In embodiments where more users are simultaneously allocated, an interference metric may be determined as the accumulated or averaged value of interference metrics for all possible pair combinations of user equipments in the subset but the present mathematical derivation can be also extended to more users by adding $H_3$ to $H_n$.

Experiments have shown that this metric may provide very efficient scheduling results in substantial performance and capacity increase of the communication system as a whole. Furthermore, the interference metric is easy to calculate and is based only on channel estimates thereby reducing computational requirements.

Figure 2:
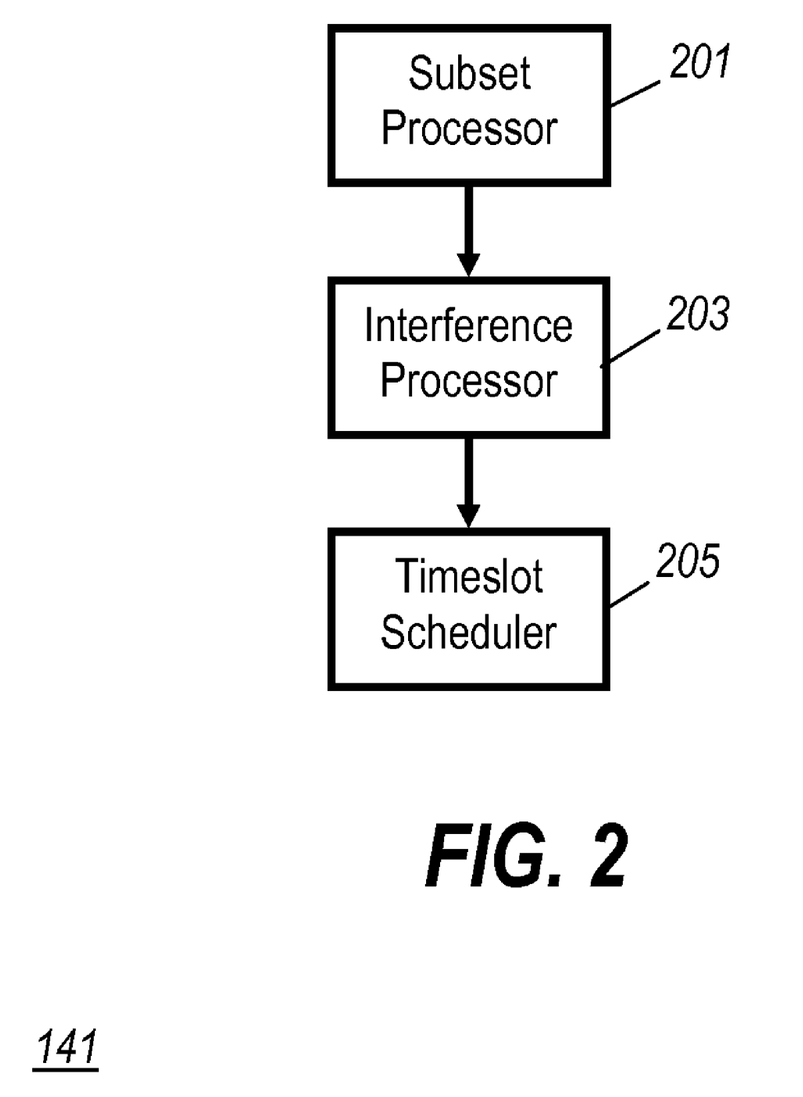
FIG. 2 is an illustration of elements of an air interface scheduler for a radio communication system in accordance with some embodiments of the invention.

FIG. 2 illustrates an example of the air interface scheduler 141 in more detail. In the example, the scheduler 141 comprises a subset processor 201 which generates the subsets that are evaluated. Specifically, out of a pool of user equipments that are to be scheduled, the subset processor 201 can generate subsets of all possible combinations of user equipments that may potentially be allocated to a scheduling time slot. In the example where two simultaneous user equipments are scheduled, the subset processor 201 generates subsets corresponding to all possible ways of combining two user equipments.

The subset processor 201 is coupled to an interference processor 203 which proceeds to generate an interference metric for each subset. In the specific example the specific metric $I_m(i,j)$ derived above can be determined for all subsets.

The interference processor 203 is coupled to a time slot scheduler 205 which evaluates the interference metrics and selects one subset for the scheduling time interval. Specifically, the subset having the lowest interference metric is selected. Thus, the user equipments for the scheduling time slot may be selected as:

$$(I, J) = \left( \operatorname*{argmin}_{i,j} \{I_m(i, j)\} \right)$$

where i and j represent all possible active users. This algorithm is relatively complex and the complexity can be shown to be proportional to $\frac{1}{2}p(p+1)(4p-1)-1$ where p is the number N of user equipments in the scheduling pool divided by two.

After the user equipments to be scheduled have been selected, the time slot scheduler 205 proceeds to distribute the scheduling information to the user equipments (e.g. over the air interface).

In another scheduling approach, the scheduler 141 first selects a first user equipment from the resource pool in response to a selection criterion. For example, the user equipment may be selected randomly, in response to a parameter associated with the user equipment (such as a current delay or quality of service requirement). In some embodiments, the first user equipment may be selected by a single user scheduling algorithm, such as a higher layer existing scheduling algorithm designed for allocating resource to users in response to a given fairness requirement (e.g. all users are sequentially scheduled). Thus, this approach may ensure that each user is at least allocated resource in accordance with this approach while allowing an additional resource allocation in each scheduling time slot.

After the first user equipment has been selected, the subset processor 201 generates all possible subsets of user equipments that include the first user equipment. The interference processor 203 then determines the interference metric and the time slot scheduler 205 selects the subset with the lowest metric.

Thus, for the example where two user equipments are allocated in each scheduling time slot, the scheduler 141 may specifically select the user equipments for the scheduling time slot as:

$$(I, J) = \left( i, \operatorname*{argmin}_{j, j \neq i} \{I_m(i, j)\} \right)$$

where i is selected in responses to the selection criterion and j includes all other user equipments.

An advantage of this approach is that it may substantially reduce the complexity and it can be shown that the complexity is proportional to p(p−1)/2 where p is the number N of user equipments in the scheduling pool divided by two.

The described scheduling algorithms have focused on individually selecting user equipments for each scheduling time slot. However, it is often desirable that the entire pool of user equipments are scheduled within a given time limit. Thus, the algorithms may e.g. be amended by including a requirement that all user equipments of the second set are comprised in at least one scheduled subset within a given time interval. For example, within a given scheduling frame comprising N/2 scheduling time slots, the N user equipments must all be scheduled. This may for example be achieved by removing any user equipments from the scheduling pool whenever they are scheduled thereby leaving only user equipments that have not yet been scheduled within the scheduling frame. A new resource pool may then be generated for the new scheduling frame.

In some embodiments, user equipments may not be scheduled individually for each scheduling time slot by considering only the interference metrics for that scheduling time slot. Rather, in some embodiments, the scheduler 141 may perform a combined scheduling for a plurality of scheduling time slots such that an accumulated interference metric for the scheduled subsets is minimized.

For example, for a given scheduling frame the N user equipments may be distributed over the N/2 scheduling time slots in response to the accumulated interference metric given by summing the interference metric of the individual scheduling time slots. For example, an exhaustive search may be performed wherein the accumulated interference metrics for all possible allocations of the N user equipments to the N/2 scheduling time intervals are determined. The scheduler may then select the distribution which results in the lowest interference metric.

Such an approach is likely to result in an increased performance and capacity of the system. However, the complexity and computational requirement may increase substantially and specifically the complexity can be found to be represented by $(2p)!/2^p/p!$ i.e there is an exponential increase for increasing user equipments in the scheduling pool.

Figure 3:
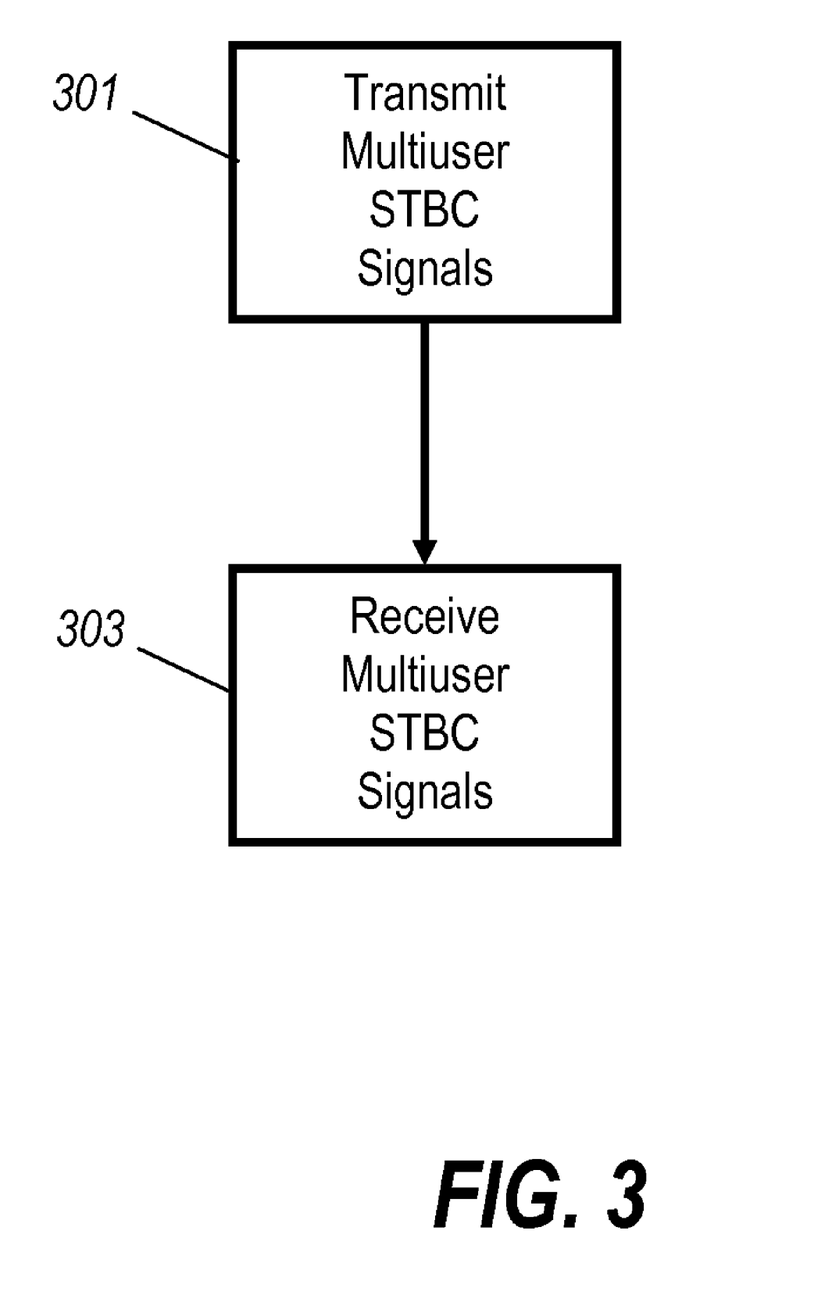
FIG. 3 is an illustration of an example of a flowchart for a method of operation for a communication system.

FIG. 3 illustrates an example of a flowchart for a method of operation for a communication system.

The method initiates in step 301 wherein a set of user equipments simultaneously transmit a signal over an air interface to a base station. Each signal comprises a data stream encoded by a space time block code and transmitted on multiple antennas.

Step 301 is followed by step 303 wherein the base station generates a received data stream for each of the set of user equipments by joint space time block code decoding of the signals from the set of user equipments.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The Abstract is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A base station comprising:
 a receiver for generating a received data stream by joint space time block code decoding a plurality of data streams transmitted simultaneously by a plurality of user equipments;
 a subset processor that generates a plurality of subsets of possible combinations of the plurality of user equipments to evaluate for allocation to a scheduling time slot;
 an interference processor coupled to the subset processor, the interference processor configured to determine an interference metric for the plurality of subsets; and
 a time slot scheduler coupled to the interference processor, the time slot scheduler evaluating the interference metric and selecting a subset having a lowest interference metric for the scheduling time slot.

2. The base station of claim 1 wherein the interference metric is determined from $$I_m(i, j) = \frac{|h_{i1}^H h_{j1} + h_{i2}^T h_{j2}^*|^2 + |h_{i1}^H h_{j2} - h_{i2}^T h_{j1}^*|^2}{(\|h_{i1}\|^2 + \|h_{i2}\|^2)(\|h_{j1}\|^2 + \|h_{j2}\|^2)}$$

where $h_{i1}$, $h_{i2}$ are channel estimate vectors comprising channel estimates for propagation channels between transmit antennas of user equipment i and receive antennas of the base station in two data symbol time slots of the space time block code and $h_{j1}$, $h_{j2}$ are channel estimate vectors comprising channel estimates for propagation channels between transmit antennas of user equipment j and receive antennas of the base station in two data symbol time slots of the space time block code.

3. The base station of claim 1 wherein the subset processor generates a plurality of subsets based on all possible pair combinations of the plurality of user equipments.

4. The base station of claim 1 wherein the subset processor selects a first user equipment of the plurality of user equipments and generates the plurality of subsets based on all pair combinations having the first user equipment as a member of the pair.

5. The method of claim 4 wherein the subset processor generates the plurality of subsets based on all possible pair combinations of the plurality of user equipments.

6. The method of claim 4 wherein the subset processor selects a first user equipment of the plurality of user equipments and generates the plurality of subsets based on all pair combinations having the first user equipment as a member of the pair.

7. A method comprising:
in a receiver, generating a received data stream by joint space time block code decoding a plurality of data streams transmitted simultaneously by a plurality of user equipments;
by a subset processor, generating a plurality of subsets of possible combinations of the plurality of user equipments to evaluate for allocation to a scheduling time slot;
by an interference processor, determining an interference metric for the plurality of subsets; and
by a time slot scheduler, evaluating the interference metric and selecting a subset having a lowest interference metric for the scheduling time slot.

8. The method of claim 7 wherein the interference metric is determined from $$I_m(i, j) = \frac{|h_{i1}^H h_{j1} + h_{i2}^T h_{j2}^*|^2 + |h_{i1}^H h_{j2} - h_{i2}^T h_{j1}^*|^2}{(\|h_{i1}\|^2 + \|h_{i2}\|^2)(\|h_{j1}\|^2 + \|h_{j2}\|^2)}$$

where $h_{i1}$, $h_{i2}$ are channel estimate vectors comprising channel estimates for propagation channels between transmit antennas of user equipment i and receive antennas of the base station in two data symbol time slots of the space time block code and $h_{j1}$, $h_{j2}$ are channel estimate vectors comprising channel estimates for propagation channels between transmit antennas of user equipment j and receive antennas of the base station in two data symbol time slots of the space time block code.

* * * * *